(12) United States Patent
Bouffanais et al.

(10) Patent No.: US 10,286,994 B2
(45) Date of Patent: May 14, 2019

(54) NOSE SECTION FOR A FLYING MACHINE AND ASSOCIATED FLYING MACHINE

(71) Applicant: DASSAULT AVIATION, Paris (FR)

(72) Inventors: Fabien Bouffanais, Chatenay-Malabry (FR); Benoit De Maqueville, Saint Andre de Cubzac (FR); Olivier Gavouyere, Boulonge-Billancourt (FR); Zdenek Johan, Garches (FR)

(73) Assignee: DASSAULT AVIATION, Paris (FR)

(*) Notice: Subject to any disclaimer, the term of this patent is extended or adjusted under 35 U.S.C. 154(b) by 346 days.

(21) Appl. No.: 14/044,110

(22) Filed: Oct. 2, 2013

(65) Prior Publication Data

US 2014/0097295 A1 Apr. 10, 2014

(30) Foreign Application Priority Data

Oct. 5, 2012 (FR) ...................... 12 02673

(51) Int. Cl.
*B64C 1/14* (2006.01)
*B64D 47/08* (2006.01)

(52) U.S. Cl.
CPC .......... *B64C 1/1484* (2013.01); *B64C 1/1492* (2013.01); *B64D 47/08* (2013.01)

(58) Field of Classification Search
CPC ....... B64C 1/1492; B64C 1/1484; B64C 1/14; B64C 2201/127; B64C 1/36; B64D 45/08; B64D 47/08
USPC ... 244/3.13, 130, 3.16, 3.17, 3.19, 119, 121, 244/129.1, 129.3; 102/213, 214; 343/705, 708, 872
See application file for complete search history.

(56) References Cited

U.S. PATENT DOCUMENTS

| 3,053,932 A | | 9/1962 | Worst | |
|---|---|---|---|---|
| 3,114,526 A | * | 12/1963 | Morgan | 244/120 |
| 3,229,937 A | * | 1/1966 | Grillo et al. | 244/149 |
| 3,261,575 A | * | 7/1966 | Lock et al. | 244/120 |
| 3,331,570 A | * | 7/1967 | Kinnerley et al. | 244/121 |
| 5,372,333 A | * | 12/1994 | Uwira et al. | 244/3.16 |
| 6,056,237 A | * | 5/2000 | Woodland | 244/3.15 |
| 7,392,963 B1 | * | 7/2008 | Leek et al. | 244/3.13 |
| 7,706,978 B2 | * | 4/2010 | Schiffmann et al. | 701/301 |

(Continued)

FOREIGN PATENT DOCUMENTS

| EP | 0 511 154 A2 | 10/1992 |
|---|---|---|
| EP | 0 653 887 A2 | 5/1995 |

(Continued)

OTHER PUBLICATIONS

"Gulfstream EVS Places a Revolutionary Safety Standard in Clear View", Gulfstream Aerospace Corporation, 2002-2003.*

(Continued)

*Primary Examiner* — Assres H Woldemaryam

(57) ABSTRACT

The nose section for a flying machine according to the invention comprises an enclosure delimiting a nose cone extending along a longitudinal axis (A-A'), the enclosure delimiting a window, and a glass closing the window extending transversely relative to the longitudinal axis (A-A'). The nose section includes an optical sensor, in particular a camera, positioned in the enclosure behind the glass. The enclosure defines a recess, the window covered by the glass being at least partially positioned in the recess.

15 Claims, 5 Drawing Sheets

(56) References Cited

U.S. PATENT DOCUMENTS

| | | | |
|---|---|---|---|
| 8,575,527 B2* | 11/2013 | Fry | 244/3.16 |
| 2005/0007261 A1* | 1/2005 | Berson et al. | 340/945 |
| 2005/0099433 A1* | 5/2005 | Berson et al. | 345/619 |
| 2006/0016940 A1 | 1/2006 | Morgan | |
| 2012/0234968 A1* | 9/2012 | Smith | 244/12.3 |
| 2014/0139730 A1* | 5/2014 | White et al. | 348/373 |
| 2014/0231578 A1* | 8/2014 | Lavoie | 244/13 |

FOREIGN PATENT DOCUMENTS

| | | |
|---|---|---|
| FR | 2890643 | 3/2007 |
| JP | S58799 A | 1/1983 |
| JP | 2012166656 A | 9/2012 |

OTHER PUBLICATIONS

Richard L. Johnson, "Safety by Design: A Gulfstream Perspective", p. 24, 2008.*

Shaoxuan et al., "Technology and Device for Collecting and Disposing Thermocouple," Shanghai Nuclear Engineering Research and Design Institute, Oct. 1995.

Xiaoming et al., "Automatic Inserting Technology and Inserting Manipulator for the Thermocouple of NPP Reactor," Shanghai Nuclear Engineering Research and Design Institute, Oct. 1995.

Search Report for French Application No. FR 12 02673, dated Jun. 25, 2013.

* cited by examiner

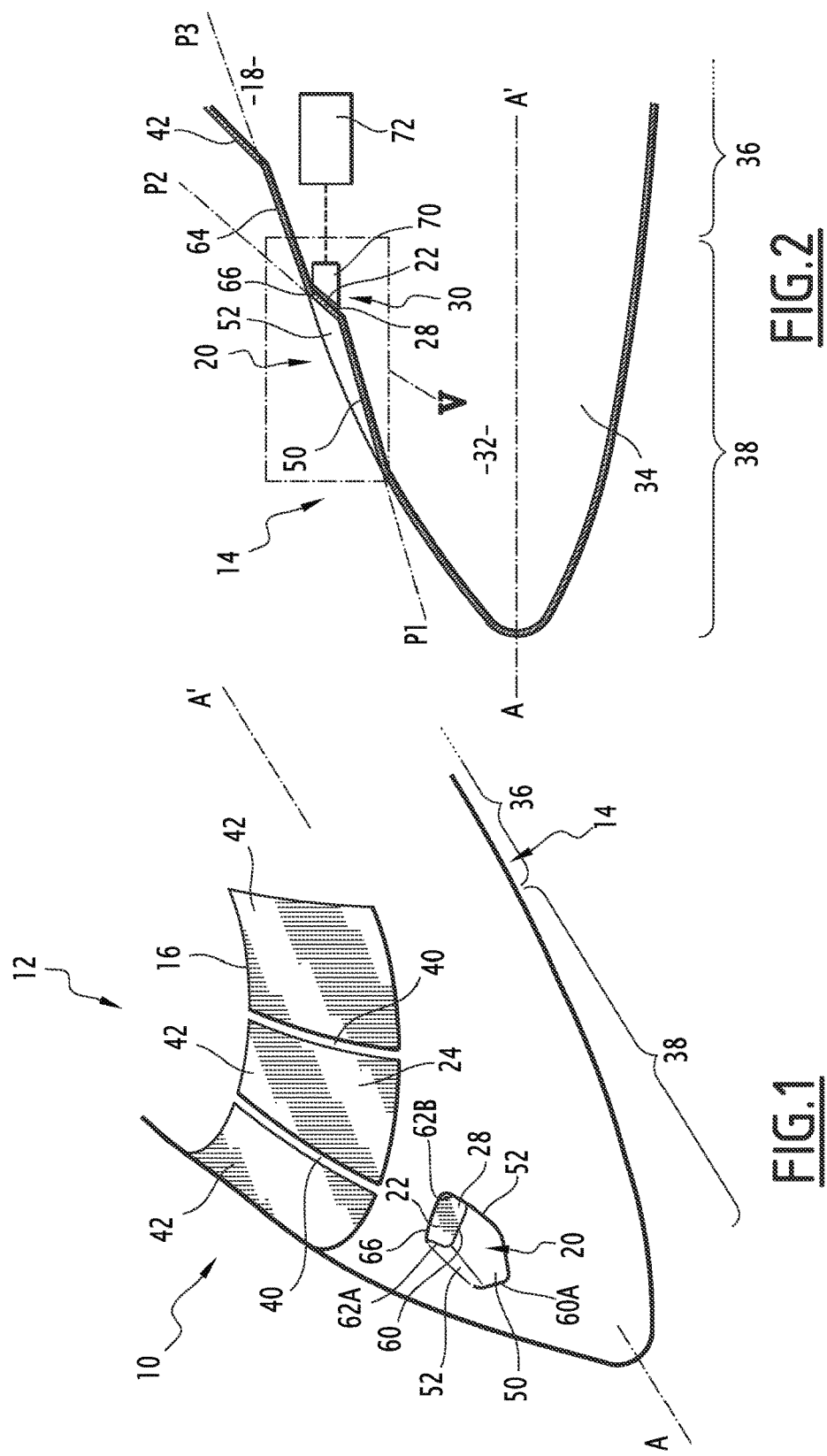

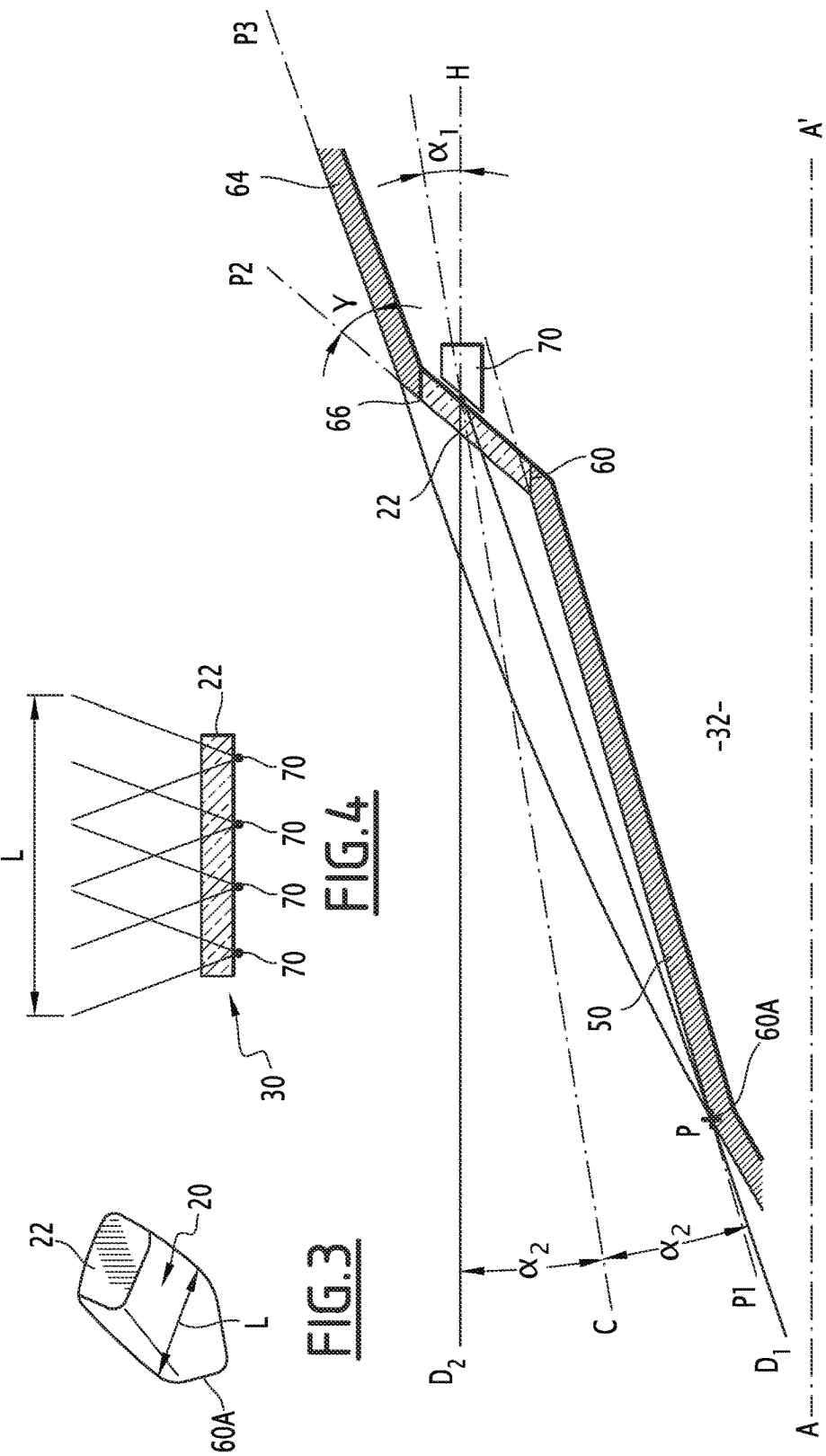

US 10,286,994 B2

NOSE SECTION FOR A FLYING MACHINE AND ASSOCIATED FLYING MACHINE

CROSS-REFERENCE TO RELATED APPLICATIONS

This application claims benefit of French patent application serial number FR 12 02673, filed Oct. 5, 2012, which is herein incorporated by reference.

BACKGROUND OF THE INVENTION

Field of the Invention

The present invention relates to a nose section for a flying machine, comprising:
 a glass closing the window extending transversely relative to the longitudinal axis;
 an optical sensor, in particular a camera, positioned in the enclosure behind the glass.

Description of the Related Art

Such a nose section is designed to be mounted on a flying machine comprising a viewing assembly provided with at least one optical measuring sensor, such as an infrared camera. In the case of an airplane, the sensor is for example positioned upstream of the windshield of the cockpit, so as to facilitate piloting of the flying machine.

The camera is capable of viewing the relief situated around and below the flying machine, in particular when the visibility through the windshield of the cockpit is not satisfactory, or when the flying machine is traveling at night.

To that end, the camera is positioned in the nose section of the flying machine, facing a glass in a window emerging axially relative to the axis of the flying machine. The camera is housed in a specific cap strip that protrudes relative to the nose cone of the vehicle, so as to have an adequate field of vision in front of and below the flying machine.

Such a system is called an enhanced vision system.

When the curvature of the nose section is relatively small, it is necessary to provide a cap strip that protrudes significantly above that nose section, in order to have a sufficient viewing angle for the viewing assembly, in particular downward.

Such a protruding cap strip is not, however, fully satisfactory. In fact, in some cases, the cap strip is likely to cause disruptions to the aerodynamic behavior of the nose section. In particular, a separation of the boundary layer occurs downstream from the upper edge of the cap strip, which has an unfavorable impact on the drag of the airplane, as well as on the operation of the anemometric probes fixed on the area of the nose section.

Furthermore, when the flying machine passes through icing conditions, the presence of the protruding cap strip in some cases causes ice to accumulate on the fuselage. This is particularly the case when the electrical heating system of the enhanced viewing system does not work.

Furthermore, the presence of the protruding cap strip increases the noise present in the cockpit.

SUMMARY OF THE INVENTION

One aim of the invention is therefore to obtain a nose section of a flying machine provided with an optical sensor assisting with piloting and in which the normal behavior of the flying machine is not disrupted.

To that end, the invention relates to a nose section of the aforementioned type, characterized in that the enclosure defines a recess, the window covered by the glass being at least partially positioned in the recess.

The structure according to the invention may comprise one or more of the following features, considered alone or according to all technically possible combinations:
 the recess extends axially in the nose cone;
 the window is positioned behind the recess;
 the recess is downwardly delimited by a substantially planar lower plate;
 the recess is laterally delimited by two side walls extending substantially vertically;
 the window is delimited by an upper edge, the angle formed between the plane of the window adjacent to the upper edge and the plane of a rear region of the enclosure adjacent to the upper edge, in a median axial plane, being smaller than 35°;
 the window covered by the glass partially protrudes outside the recess;
 the window covered by the glass is completely included in the recess, without protruding beyond the recess;
 the recess is formed in an upper surface of the nose cone;
 the nose section defines a primary opening situated above the nose cone and designed to open into a cockpit, the nose section including a windshield covering the primary opening, and the window advantageously being positioned below the primary opening;
 the recess has a front edge with a forwardly converging shape, advantageously a substantially triangular shape.

The invention also relates to a flying machine, characterized in that it includes a nose section as defined above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading the following description, provided solely as an example, and done in reference to the appended drawings, in which:

FIG. 1 is a three-quarter front perspective view of a first nose section of a flying machine according to the invention;

FIG. 2 is a partial diagrammatic cross-sectional view along a median vertical plane of the nose section of FIG. 1;

FIG. 3 is a detailed view of the recess formed in the nose section of FIG. 1;

FIG. 4 is a cross-sectional view, along the horizontal plane, of the window positioned behind the recess of FIG. 3, and of the sensors situated behind the window;

FIG. 5 is a cross-sectional view in the plane of symmetry V of the nose section shown in FIG. 2;

DETAILED DESCRIPTION

Figure 6:
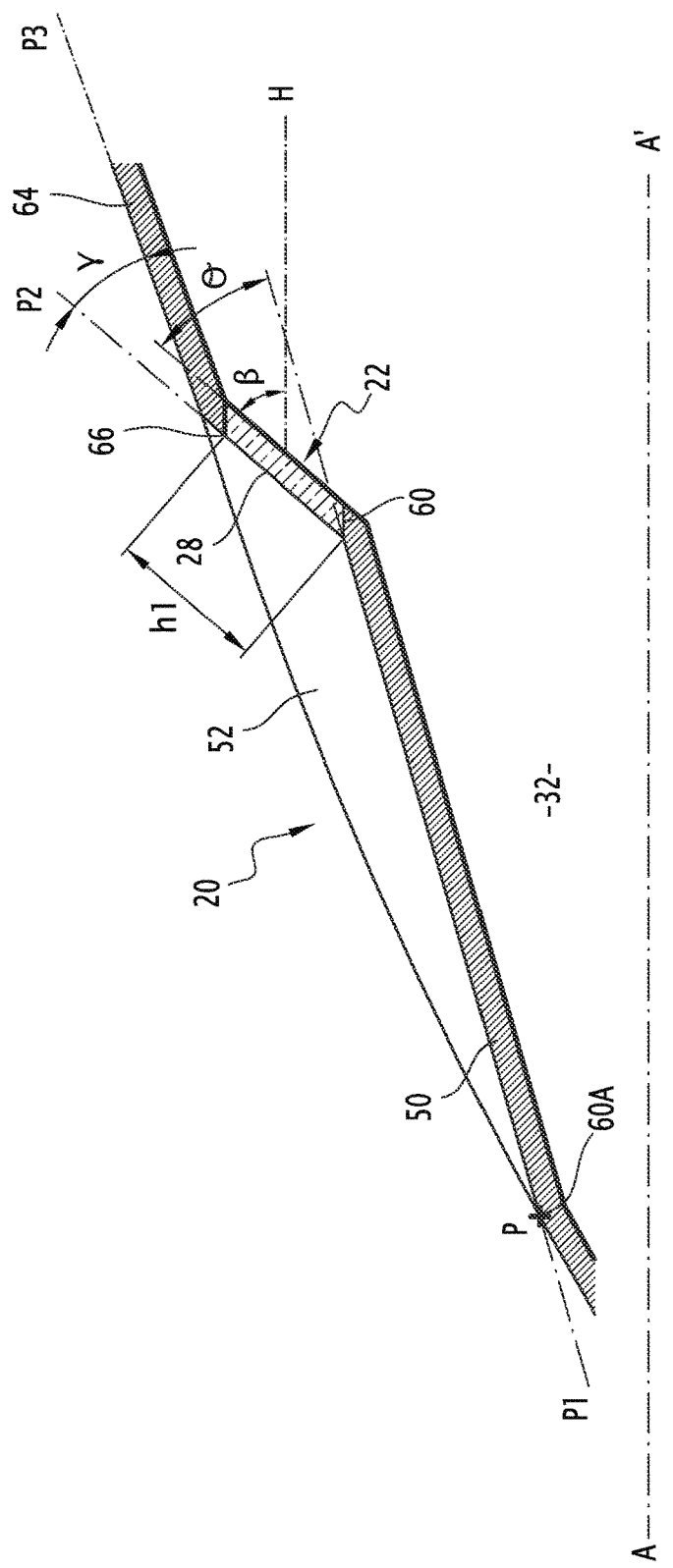
FIG. 6 is a view similar to FIG. 5.

Hereafter, the terms "horizontal" and "vertical" are understood relative to the longitudinal axis of the flying machine, when the flying machine is on the ground. The terms "front" and "rear" are to be understood relative to the typical orientations of the flying machine and its direction of travel during flight.

A first nose section 10 of a flying machine 12 according to the invention is illustrated by FIGS. 1 and 2.

The flying machine 12 is for example an airplane, in particular a civilian airplane intended to carry passengers and/or cargo. Alternatively, the flying machine 12 is a military airplane or drone, as described later.

The nose section 10 is mounted at the front of the fuselage (not shown) of the flying machine 12, the fuselage bearing the wings and/or engines of the flying machine 12.

The nose section 10 includes an outer enclosure 14 defining a primary opening 16 designed to emerge into a cockpit 18 of the flying machine. According to the invention, the enclosure 14 also delimits, in front of the primary opening 16, a recess 20 and a window 22 at least partially positioned in the recess 20.

The nose section 10 further includes a windshield 24 covering the primary opening 16 and a glass 28 closing the window 22. According to the invention, it includes a secondary viewing assembly 30 through the window 22.

In reference to FIG. 4, the viewing assembly 30 includes a plurality of optical sensors 70 (four in this example) positioned side by side, the wavelength bands for which each sensor 70 is sensitive being able to vary from one sensor 70 to the next so as to cover a broader spectrum (night vision, headlight vision, fog vision, etc.).

In a known manner, the enclosure 14 extends along the horizontal axis A-A' when the flying machine 12 is on the ground. It has a generally tapered shape toward the front. It delimits an inner volume 32 defining the cockpit 18 toward the rear, and a space 34 for storing functional equipment of the flying machine 12 toward the front.

The enclosure 14 defines a rear part 36, situated behind the primary opening 16, and a front part, situated in front of the primary opening 16, and forming a nose cone 38.

The rear part 36 has a larger transverse section than that of the nose cone 38. The primary opening 16 is formed in the rear part 36. The primary opening 16 advantageously has a curved shape, for example in the shape of a C. It is passed through by a plurality of posts 40 secured to the enclosure 14 and designed to support the windshield 24.

The windshield 24 is advantageously formed from a plurality of transparent panels 42 in the visible domain (for example, for wavelengths comprised between 400 nm and 800 nm). The panels 42 completely close the primary opening 16, while allowing the pilots of the flying machine 12 to view the space situated in front of and sideways around the flying machine 12. They are for example made up of glass or Plexiglas.

According to the invention, the recess 20 is positioned below the primary opening 16, advantageously in front of it. It extends axially in the nose cone 38. It is formed here in an upper surface of the nose cone 38.

The recess 20 is downwardly delimited by a substantially planar plate 50. The recess 20 is laterally delimited by side walls 52 extending substantially vertically. It is rearwardly delimited by the window 22 and by the glass 28 closing that window 22.

The width L (FIG. 3) of the recess 20 depends on the number of sensors 70 included by the viewing assembly 30 and on their arrangement. This width L is determined such that the nose section of the flying machine does not constitute an obstacle in the viewing field of the sensors. This viewing field is diagrammatically shown in top view in FIG. 4 by the union of the viewing cones of each of the sensors 70. In the example illustrated in FIG. 4, four sensors 70 are positioned side by side to form the viewing assembly 30.

The plate 50 is formed by a substantially planar portion of the enclosure 14. It extends substantially in a plane P1 visible in FIGS. 5 and 6 from the lower edge 60 of the window 22 to a front edge 60A embodied in FIG. 5 by a point P. The point P is geometrically determined by the intersection of the enclosure 14 of the nose section with the sighting cone of the sensor 70. In FIG. 5, the sighting cone is delimited by the rays D1 and D2. The optical axis C of the sensor 70 is situated on the bisector of the angle formed by the rays D1-D2.

The axis C is inclined by an angle $\alpha_1$, here several degrees, of the horizontal plane H to facilitate viewing of the ground by the sensor 70.

The determination of the front edge 60A and therefore the length of the plate 50 thus depends on the installation of the sensors 70 on the airplane (and in particular the incline angle $\alpha_1$ of the sensors relative to the horizontal plane H, for example 4°), as well as the sighting cones of the sensors 70 and half-angles $\alpha_2$ of those sighting cones (for example, 12°).

The length of the plate 50 is generally greater than its width, and can thus vary significantly based on the characteristics of the sensors 70 (installation and viewing field) and the curvature of the enclosure 14 of the nose section 10.

As illustrated by FIG. 3, the front edge 60A of the recess 20 has a forwardly converging shape, here a pseudo-triangular shape. The shape is determined by construction, by the intersection between the enclosure 14 of the nose section 10 and the plane passing through the base of the glass 22 and the point P.

The side walls 52 protrude substantially vertically from the plate 50. They connect the plate to the side edges 62A, 62B of the window 22. They extend over substantially the entire length of the plate.

The window 22 extends substantially transversely relative to the axis A-A' in a plane P2 that is inclined relative to the vertical. It is situated vertically below and in front of the primary opening 16.

In reference to FIG. 6, the angle β formed between the plane P2 defined by the window 22 and the horizontal plane H must be as small as possible to minimize the aerodynamic disruptions and large enough to avoid problems of diffraction of the light passing through the glass 22 and picked up by the camera, which would be detrimental to the quality of the observed image.

In practice, β is for example approximately 50°.

This incline also allows the viewing assembly 30 to have a free viewing field in front and downward.

Furthermore, according to the invention, owing to the positioning of the window 22 in the recess 20, the angle γ formed by the plane P2 of the window 22 and the plane P3 of the adjacent rear region 64 of the enclosure 14, taken tangentially at the upper edge 66 of the window 22, is smaller than 35°, and preferably smaller than 30° in a median axial plane that corresponds to the vertical plane passing through the axis A-A'.

Such angle values γ minimize the aerodynamic disruptions during movement of the flying machine 12 in a mass of air.

The window 22 has a height h1, taken along its plane P2, smaller than its width, taken between its edges 62A, 62B.

The glass 28 covers the window 22. It is for example made from a material transparent to infrared or ultraviolet radiation, such as glass whose optical properties are compatible with the technical characteristics of the sensors 70. It sealably closes the window 22.

The glass 28 is completely included in the recess 20.

In reference to FIG. 2, the viewing assembly 30 includes four optical sensors 70 and a processing unit 72 connected to the optical sensors 70 to display an image representative of the space situated in front of the flying machine 12.

The optical sensors 70 are mounted behind the window 22, for example in contact with the glass 28.

The processing unit 72 is capable of analyzing the signal received from the sensors 70 to form an image, and display that image in the cockpit 18 to make it available to the pilots of the flying machine 12. The image is for example displayed on a screen of the cockpit, or on an overhead viewing device.

When the flying machine 12 is in flight, the presence of a recess 20 in the enclosure 14 of the nose section 10, at least partially housing the window 22, ensures effective viewing of the space situated in front of and below the flying machine, using optical sensors 70, in particular during landing phases.

Furthermore, positioning the window 22 and its glass 28 at least partially in the recess 20 minimizes the aerodynamic disruptions on the flying machine 12. In particular, tucking the window 22 and its glass 28 into the recess 20 substantially eliminates the wake separation that occurs with a cap strip noticeably protruding relative to the upper surface of the nose cone 38.

Thus, the anemometric measuring probes (not shown) located in the area of the nose section 10 are not disrupted and operate suitably. It is therefore possible both to improve the piloting conditions of the flying machine 12, by offering precise viewing of the terrain situated in front of the flying machine 12, while avoiding aerodynamic disruptions on the flying machine 12. Furthermore, the quantity of ice formed on the window 22 under icing conditions is reduced when the heating system breaks down. Furthermore, the noise in the cockpit of the flying machine 12 is decreased.

Figure 8:
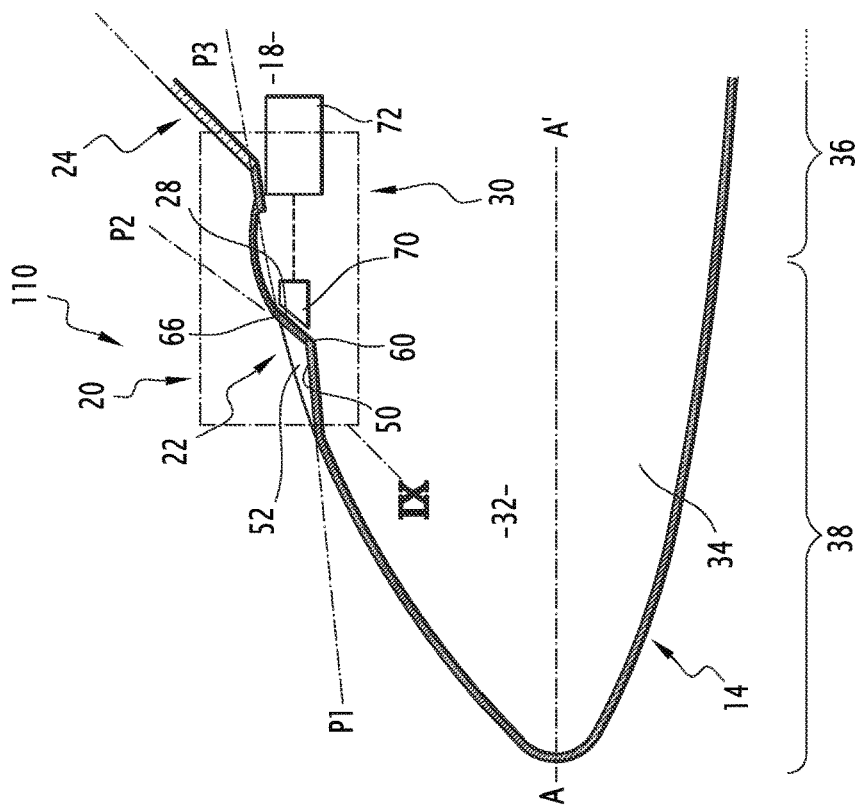
FIG. 8 is a view similar to FIG. 2 of the nose section of FIG. 7.
Figure 7:
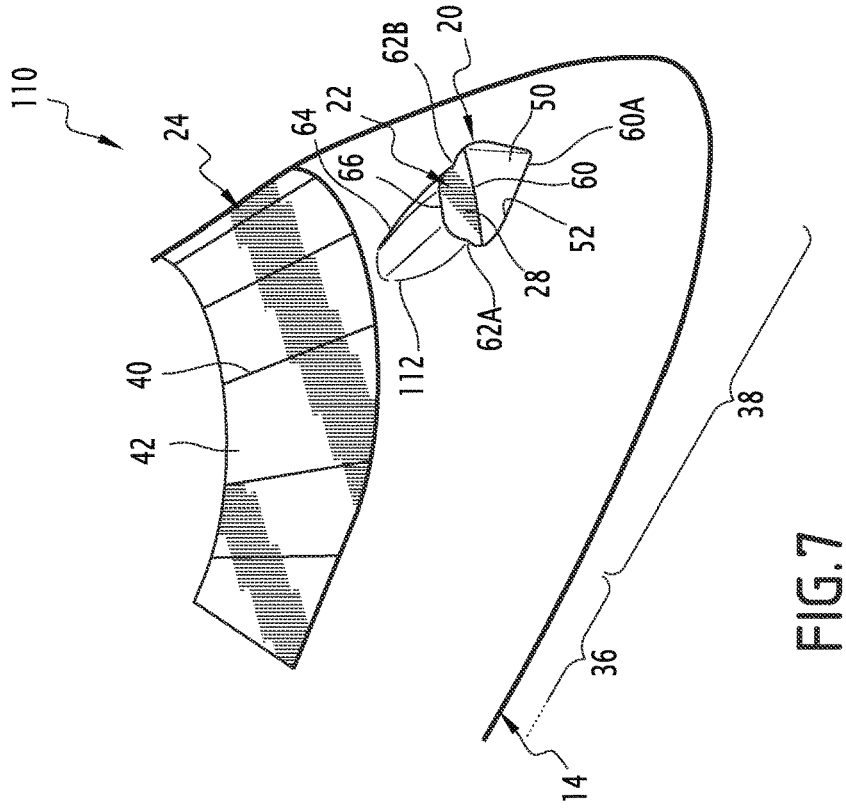
FIG. 7 is a view similar to FIG. 1 of a second nose section of a flying machine according to the invention.
Figure 9:
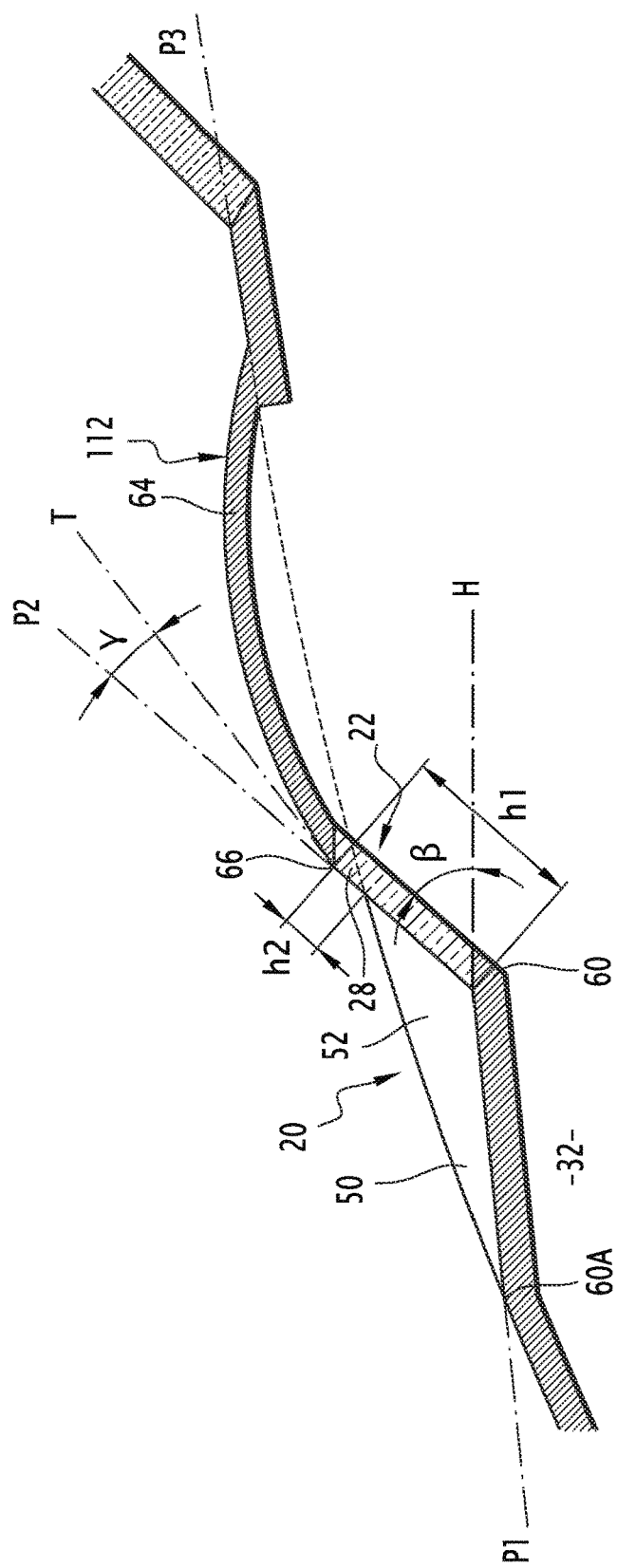
FIG. 9 is a view similar to FIG. 5 of the nose section of FIG. 7.

A second nose section 110 according to the invention is illustrated diagrammatically by FIGS. 7 to 9.

Unlike the nose section 10 shown in FIGS. 1 and 2, the window 22 is partially included in the recess 20, and partially protrudes outside the recess 20.

To that end, the rear region 64 of the enclosure 14 forms a profiled cap strip 112 that extends longitudinally along the axis of the flying machine and protrudes relative to the adjacent side regions. In this example, the cap strip 112 has an upwardly oriented convex curvature.

Advantageously, at least 30% of the surface of the window 22 is positioned in the recess, for example 50%.

The behavior of the nose section 110 is also similar to that of the nose section 10. However, this nose section 110 is particularly suited to nose sections having a reduced diameter while allowing a more gradual transition of the slope between the front part and the rear part of the nose section 110, which avoids the creation of any separation despite the partial protrusion of the window 22.

Alternatively, the viewing assembly 30 includes a number of sensors other than four and/or sensors arranged differently from the arrangement of the illustrated example, or may only have a single sensor. In particular, for certain sensor arrangements, the side edges 62A and 62B of the window 22 are longer than the lower edge 60 and the upper edge 66 of that window.

Alternatively, the window 22 is positioned below the nose cone 38, on the side opposite the opening 16, in a lower surface of the nose section 10, 110.

In another alternative, the flying machine 12 is a drone, and is then provided with no primary opening 16 emerging in a cockpit 18, and the images obtained by the viewing assembly 30 are recorded or transmitted remotely to a ground station.

According to still another alternative, the glass 28 is not a separate element from the viewing assembly 30, but is integrated into the assembly.

More generally, each sensor 70 is positioned behind the glass 8, either by being integrated or applied against the glass 28, or by being positioned away from the glass 28.

It results from the above description and from FIG. 6 that the angle θ formed between the plane P2 defined by the window 22 and the plane P1 of the plate 50 is non-zero, and is advantageously greater than 10°.

Similarly, the angle γ formed by the plane P2 of the window 22 and the plane P3 of the adjacent rear section 64 of the enclosure 14 is non-zero and advantageously higher than 10°.

While the foregoing is directed to embodiments of the present invention, other and further embodiments of the invention may be devised without departing from the basic scope thereof, and the scope thereof is determined by the claims that follow.

The invention claimed is:

1. A nose section for a flying machine, comprising:
an enclosure delimiting a nose cone extending along a longitudinal axis, the enclosure delimiting a window,
a glass closing the window extending transversely relative to the longitudinal axis;
an optical sensor positioned in the enclosure behind the glass,
the enclosure defining a recess, the window covered by the glass being at least partially positioned in the recess,
the flying machine being subsonic,
the optical sensor being configured to emit a signal allowing the display of an image representative of a terrain situated in front of the flying machine.

2. The nose section according to claim 1 wherein the recess extends axially in the nose cone.

3. The nose section according to claim 1 wherein the window is positioned at the back of the recess.

4. The nose section according to claim 1 wherein the recess is delimited rearwardly by the window and a plane closing the window.

5. The nose section according to claim 1 wherein the recess is downwardly delimited by a substantially planar lower plate.

6. The nose section according to claim 1 wherein the recess is laterally delimited by two side walls extending substantially vertically.

7. The nose section according to claim 1 wherein the window is delimited by an upper edge, an angle formed between a plane of the window adjacent to the upper edge and a plane of a rear region of the enclosure adjacent to the upper edge, in a median axial plane, being smaller than 35°.

8. The nose section according to claim 1 wherein the window covered by the glass partially protrudes outside the recess.

9. The nose section according to claim 1 wherein the window covered by the glass is completely included in the recess, without protruding beyond the recess.

10. The nose section according to claim 1 wherein the recess is formed in an upper surface of the nose cone.

11. The nose section according to claim 1 wherein the nose section defines a primary opening situated above the nose cone and designed to open into a cockpit, the nose section including a windshield covering the primary opening, and the window advantageously being positioned below the primary opening.

12. The nose section according to claim 1 wherein the recess has a front edge with a forwardly converging shape, advantageously a substantially triangular shape.

13. The subsonic flying machine comprising:
   the nose section according to any one of the preceding claims.

14. The nose section according to claim 1 wherein the optical sensor is a camera.

15. A nose section for a flying machine, comprising:
   an enclosure delimiting a nose cone extending along a longitudinal axis, the enclosure delimiting a window,
   a glass closing the window extending transversely relative to the longitudinal axis; and
   an optical sensor positioned in the enclosure behind the glass,
   the enclosure defining a recess, the window covered by the glass being at least partially positioned in the recess,
   the recess being formed in an upper surface of the nose cone,
   the optical sensor having an optical axis inclined downwardly.

* * * * *